Nov. 1, 1960  J. C. BREGAR  2,958,819
METHOD AND APPARATUS FOR ADJUSTING MAGNETOMETERS
Filed March 25, 1952
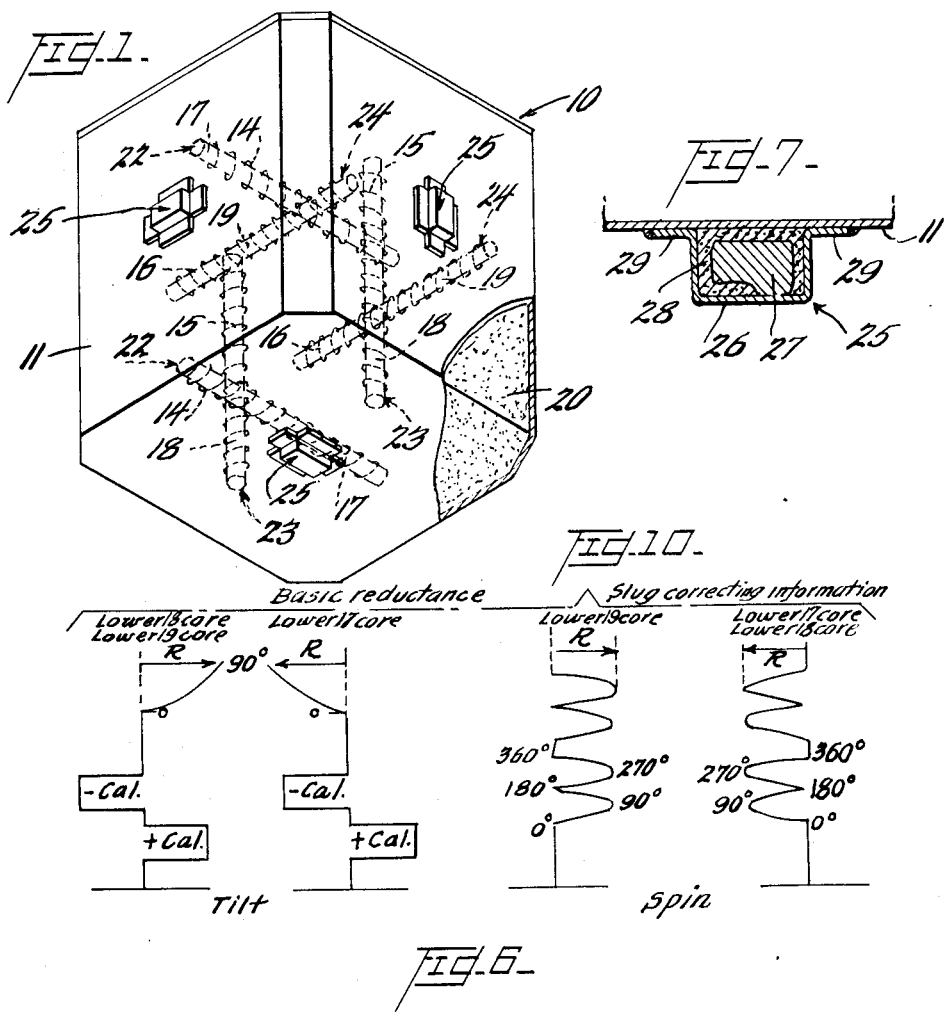
Inventor
Joseph C. Bregar
BY
C. B. Hamilton ATTORNEY

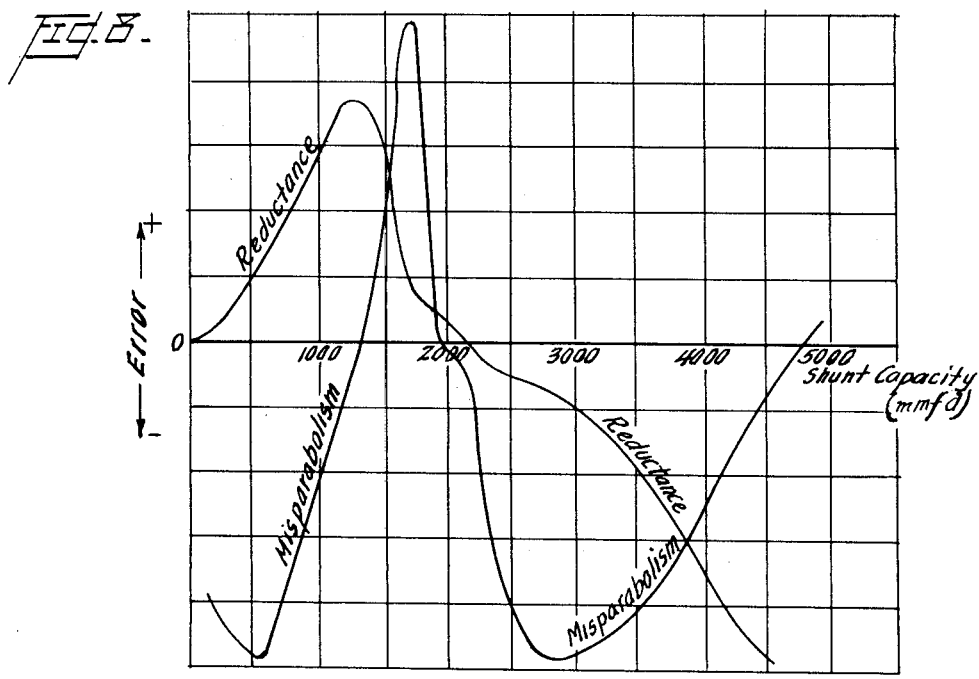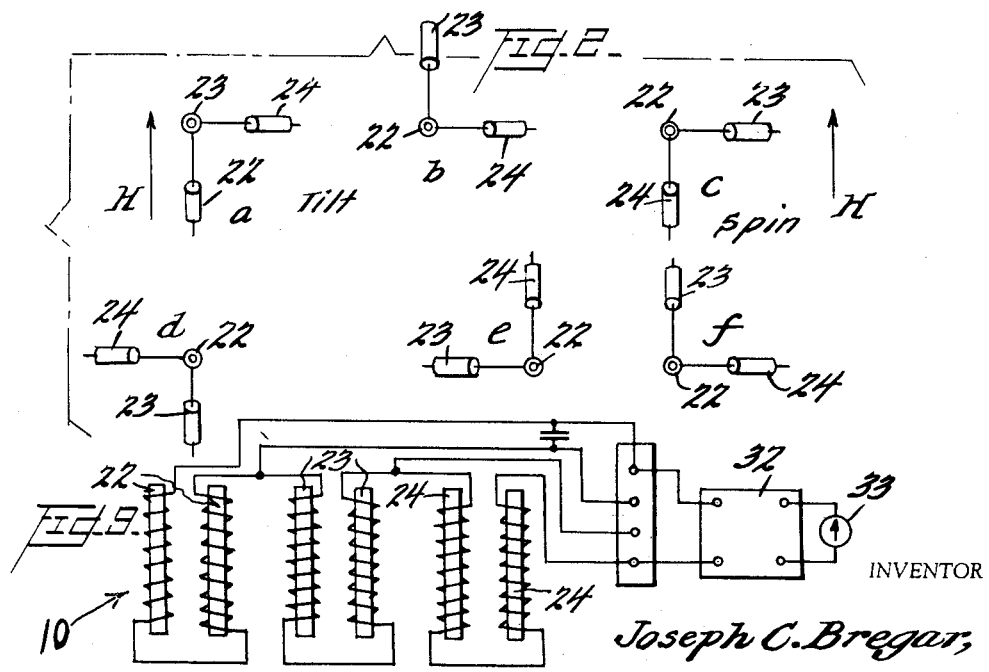

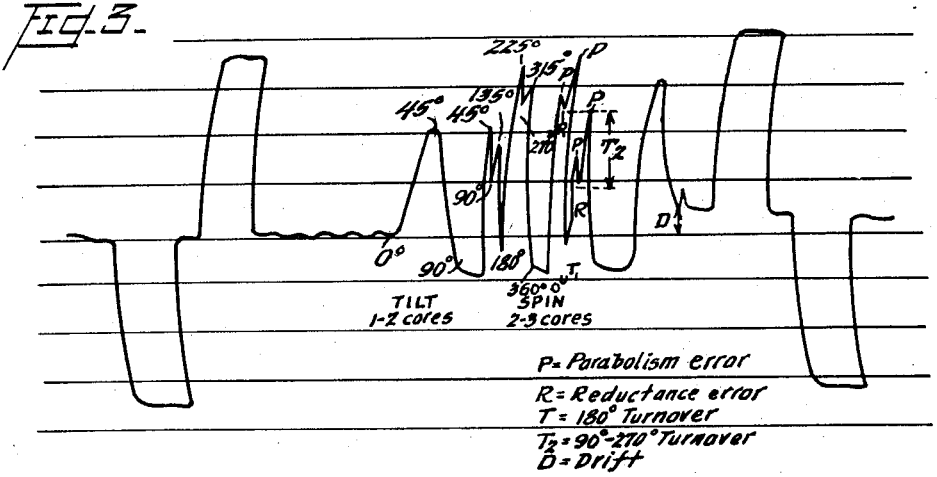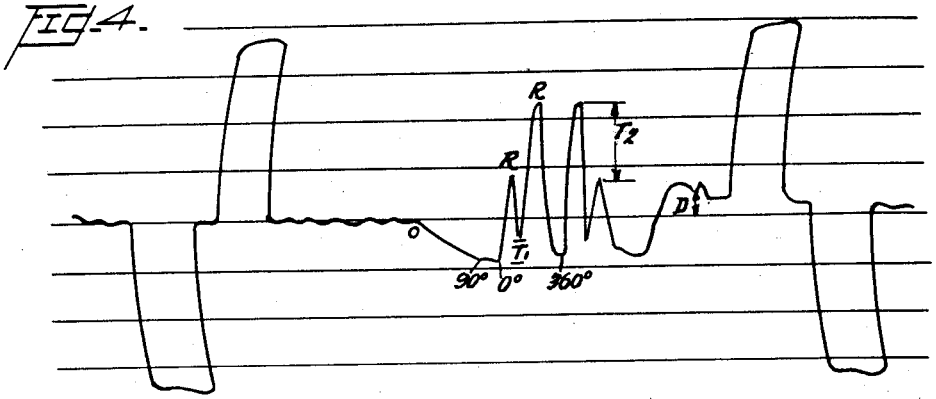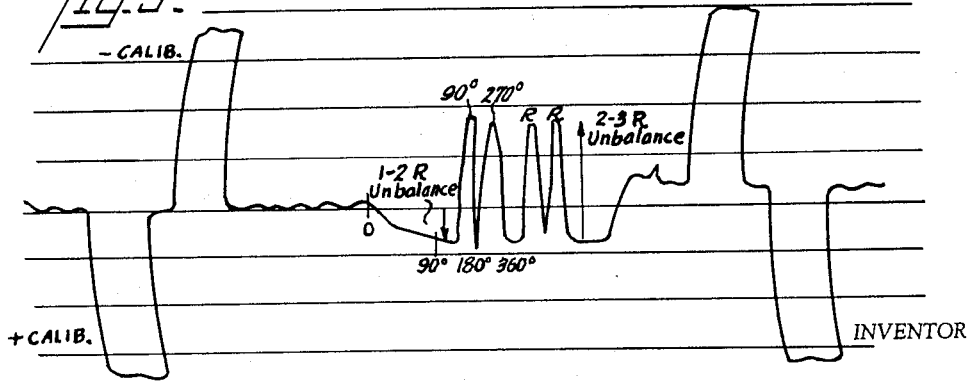

United States Patent Office 2,958,819
Patented Nov. 1, 1960

2,958,819

METHOD AND APPARATUS FOR ADJUSTING MAGNETOMETERS

Joseph C. Bregar, Winston-Salem, N.C., assignor to Western Electric Company, Incorporated, New York, N.Y., a corporation of New York Filed Mar. 25, 1952, Ser. No. 278,514

17 Claims. (Cl. 324—43)

This invention relates to magnetometers and more particularly to a method and apparatus for correcting errors in electrical characteristics of a total field magnetometer.

The earth's magnetic field over any given small area is substantially uniform unless distorted by the presence of paramagnetic or dimagnetic materials, the presence of which usually results in the changing of both the direction and absolute intensity of the field. In most cases, the paramagnetic or dimagnetic body which produces the disturbance will be located at a considerable distance from any instrument used to measure the field strength, and if the presence of the disturbing body is to be detected, the measuring instrument must be highly sensitive and give a direct indication regardless of its geometrical alignment with respect to either the field or the disturbing body.

Total field magnetometers consist of magnetometer elements arranged in three mutually perpendicular planes, the actual value of the total magnetic field at any instant being determined by measuring its components in each of the three planes. Each of these magnetometer elements consists of a coil wound on a low retentivity magnetic core of high permeability. The properties of the individual elements being very critical, the characteristics of each magnetometer element or pair of elements, if there is more than one in each plane, must coincide with all others within extremely fine tolerances. As an indication of the magnitude of error permissible, the inductance of the magnetometer elements must be accurate within a few microhenries in inductances in the order of 10 millihenries. Errors are eliminated as far as possible during the manufacture of magnetometers by a trial and error process of matching the magnetic properties of individual cores. However, after a magnetometer is assembled in a completed mechanism, errors arise due to uncontrollable changes in the process of manufacture and also due to the proximity of other necessary magnetic materials to the magnetometer, and in the past there has been no known way of correcting inductance errors in the completed mechanism.

By application of the present invention, the error in the indication of the field strength caused by the magnetometer is separated into several components and each component is separately corrected. A reductance (reduction in inductance) component of error is present when the full field reductance of each pair of magnetometer elements in a total field magnetometer is not equal to the reductance of any other pair of elements. A misparabolism component of error is present when the inductance under the application of a magnetic field does not vary parabolically as the field strength is increased to a maximum working value in a restricted range. Other components of error present are turnover and drift errors that are due to random fluctuations of the magnetic properties of the material.

An object of this invention is to provide a simple method for discovering errors in electrical characteristics of a total field magnetometer, to resolve the errors into their component parts, and correct them to provide a very sensitive magnetometer.

Another object is to provide a method and an apparatus to eliminate such errors so that an ultra-sensitive response to small variations in low strength magnetic fields may be obtained with minimum error.

A further object of this invention is to measure and adjust inductance changes in magnetometer elements with variations in flux linkages.

A still further object of this invention is to measure the inductance change in magnetometer elements caused by variations in their relative positions in the magnetic field.

With these and other objects in view, the invention comprises measuring the errors in electrical characteristics of a total field magnetometer and separating the errors into their component parts by successively spinning and tilting the magnetometer about its axes in a magnetic field and analyzing the data thus obtained. The misparabolism component of error in the indication of field strength is then corrected by adjusting the shunt capacitance across the terminals of the appropriate magnetometer elements to correct misparabolism. The reductance errors are corrected by adjusting the paramagnetic mass in the proximity of the appropriate magnetometer elements.

Other objects and advantages will be apparent from the following detailed description when considered in conjunction with the accompanying drawings, wherein:

Fig. 1 is a perspective view of the magnetometer showing in dotted outline the internal location of the magnetometer elements;

Fig. 2 is a schematic disclosure of the magnetometer elements showing their location in a magnetic field at the beginning of the test and their subsequent transition during spin and tilt;

Fig. 3 is a typical error curve showing the variation in magnetic field strength indication caused by errors in the electrical characteristics of a magnetometer as it is successively rotated about its axes in the magnetic field;

Fig. 4 is a curve showing the variation of field strength indication caused by errors in the electrical characteristics of the magnetometer as it is successively rotated about its axes in the magnetic field with all misparabolism errors eliminated;

Fig. 5 is a curve depicting the variation of field strength indication caused by errors in the electrical characteristics of the magnetometer as it is rotated about its axes in the magnetic field with misparabolism and turnover errors eliminated;

Fig. 6 is a curve depicting the variation of field strength indication caused by errors in the electrical characteristics of the magnetometer as it is successively rotated in the magnetic field with all corrections applied;

Fig. 7 is a longitudinal section of a preferred embodiment of a paramagnetic slug used for correcting reductance errors;

Fig. 8 is an electrical characteristic curve showing the misparabolism and reductance errors of a magnetometer at different value of shunt capacitance;

Fig. 9 is a circuit diagram showing the magnetometer elements connected in a testing and measuring circuit for determining the electrical characteristics of the magnetometer under test, and Fig. 10 is a data diagram for selectively correcting reductance errors.

Referring now to the drawings, attention is first directed to Fig. 1 which illustrates a total field magnetometer designated generally by the reference numeral 10. This total field magnetometer includes a non-magnetic metallic casing 11 having three pairs of coils, 14, 15 and 16, wound over their respective cores, 17, 18 and 19. The pairs of cores, 17, 18 and 19, and the pairs of coils, 14, 15 and 16, wound thereon form the pairs of magnetometer elements 22, 23 and 24 respectively, each magnetometer element being retained in predetermined related positions in the casing 11 by a molding compound 20. The magnetometer elements 22, 23 and 24 are series connected and the pairs are located in three mutually perpendicular planes.

Fig. 2 shows the magnetometer elements 22, 23 and 24 positioned in a unidirectional magnetic field under testing conditions. The magnetometer 10 is first rotated from position (a) to position (b), this rotation being designated tilt. During tilt, the magnetometer elements 22 move from a position of maximum field to minimum field while elements 23 move from a position of minimum field to maximum field and elements 24 are unaffected. Any variation in the magnetic field strength indication at the completion of the tilt is due to a reductance error, since reductance is defined as the reduction in inductance of an element as the field strength varies from zero to a maximum, i.e., the algebraic difference between zero field strength inductance and maximum field strength inductance ($L_0 - L_{MF}$). Reductance error, therefore, is an error in the indication of the field strength due to a variation in reductance among the several pairs of magnetometer elements. If the reductance of elements 23 is too high, i.e., the inductance of elements 23 in this position is too low, a paramagnetic slug 25 (Figs. 1 and 7) is then attached to the magnetometer casing 11 in the vicinity of one of the magnetometer elements 23 to shunt flux around elements 23 to reduce the reductance thereof. However, if the reductance is too low, i.e., the inductance of elements 23 is too high in the full field position, it is impossible to correct the error by altering the reductance of elements 23 because the reductance of a magnetometer element can only be lowered by the addition of paramagnetic slugs since the slugs reduce the amount of flux passing through the core of the element. Inasmuch as the pairs of elements 22, 23, and 24 are connected in series, and since it is the matching of reductance of all the magnetometer elements that is necessary, it is possible to correct the reductance error of the magnetometer due to a low reductance of elements 23 by lowering the reductance of the elements 22 and 24 to the same value of reductance of the elements 23. Therefore, if the reductance of elements 23 is too low, i.e., the inductance of magnetometer elements 23 is too high in the full field position, slugs are affixed to the magnetometer casing in the vicinity of elements 22 and 24 to match the reductance of all the elements 22, 23, and 24.

Fig. 2(c), (d), (e) and (f) shows the next steps in the testing procedure which consist of the rotation or spinning of the magnetometer around an element 22 as an axis. This step is designated "spin" and while the tilt test is only taken through 90°, the spin test is taken through 360°.

Since reductance error is defined as the difference between zero field and full field inductance, reductance error occurs only at major axis positions, namely, 90°, 180°, 270°, and 360°; while misparabolism errors are a maximum at the midpoints to the major axis positions, 45°, 135°, 225°, and 315°. Therefore, each component of error is separated and corrected independently of the other through empirical calculations to determine the value of correction to be applied, as indicated by the curve showing the magnitude of error at different degrees of rotation (Figs. 3, 4 and 5).

Fig. 10 summarizes the results of the spin-tilt tests and discloses the proper element for correction. The amount of reductance change affecting an element is a function of the mass of the applied paramagnetic material, that is the greater the mass of slug, the greater the reduction of the reductance. The correlation between the magnitude of reductance error and the size of slug 21 to be applied to the magnetometer is determined by previous empirical trial and error measurements of change in magnetometer indication for a given size slug.

Referring now to Fig. 8, a chart of a typical variation of reductance and misparabolism errors with variable shunt capacity is shown. This chart indicates that misparabolism error varies cylically and is zero at several values of shunt capacitance and that reductance error is also dependent upon the value of shunt capacity. Misparabolism and reductance errors are not necessarily zero at the same value of shunt capacity, and hence only the misparabolism error is reduced by the use of a suitable value of shunt capacity as empirically determined.

The reductance error is corrected independently of the misparabolism error by the use of small paramagnetic masses 25 (Figs. 1 and 7) attached to the outside of the magnetometer casing 11 in the vicinity of the particular elements 22, 23 and 24 whose reductances are to be corrected. These reductance corrections are applied to any magnetometer element without varying the reductance of any other element or affecting the misparabolism adjustment of the magnetometer 10.

Hence, in the testing of a magnetometer, the misparabolism error must be corrected first. The total field magnetometer 10 (Figs. 1 and 9) is tested in the same type of circuit in which it is finally used, namely, in an unbalanced inductance-bridge magnetic-field-strength measuring instrument 32 (Fig. 9), the six series connected magnetometer elements 22, 23 and 24, constituting one arm of the bridge of the instrument 32. A signal is fed across one diagonal of the bridge and a meter 33 is placed across the other diagonal. The output current through this meter caused by the unbalance in the bridge of the instrument 32 is measured in a steady state with the magnetometer stationary in a magnetic field of a fixed value. The total field magnetometer is then rotated in the unidirectional magnetic field and any change in the inductance of the series connected magnetometer elements causes a change in the field strength indication (Figs. 3–6). Since this type of field strength measuring instrument is well known in the art, a detailed description is not necessary.

The procedure comprises placing the magnetometer 10 in a unidirectional magnetic field with element 22 parallel to this field. The magnetometer 10 is then rotated about the axis of an element 24 and the amount of misparabolism error for magnetometer elements 23 is noted at a 45° tilt and the amount of reductance error is noted at a 90° tilt. The correction for these errors is applied and the magnetometer is then rotated about the axis of the element 22. During this test, the reductance and misparabolism errors are again measured for elements 22 and 24 at 90° and 45° intervals, respectively. The correct value of shunt capacitance to be applied to each magnetometer element is calculated and the proper capacitance is connected to elements 22 and 24. Since this capacitance correction may change the amount of reductance error, the test is repeated and the value of the reductance error again determined. The value of paramagnetic mass required to correct the reductance error of each element 22 and 24 is then determined and a paramagnetic slug 25 is applied to the magnetometer casing 11 in the vicinity of the proper magnetometer element.

In another embodiment, the misparabolism is adjusted for an approximate correction by a single capacitor across the terminals of all the six series connected magnetometer elements 22, 23 and 24. However for a precise correction of the misparabolism error, each pair of magnetometer elements should have the terminals brought to the exterior of the magnetometer casing so that capacitors can be applied to individual pairs of elements (Fig. 9).

A preferred embodiment of the magnetic mass 25 is shown in Fig. 7, wherein a nonmagnetic container 26 holds a small amount of paramagnetic material 27 similar to the core material of a magnetometer element, but in a mold powder form. A molding compound 28 completely surrounds the paramagnetic material 27 and fills the container 26. Four horizontal extending portions 29 of the nonmagnetic container 26 are soldered to the external surface of the magnetometer casing 11 in the correct predetermined position, relative to the particular magnetometer element to be corrected. Various containers 26 may have different amounts of magnetic material 27 therein so that different values of correction may be obtained.

It is to be understood that while the embodiment disclosed and described herein is a preferred one, the invention is susceptible to many different forms and that other instrumentalities may be substituted for those disclosed and that various changes and modifications may be made without departing from the spirit and scope of the invention.

What is claimed is:

1. A method of correcting errors in the electrical characteristics of a total field magnetometer after the magnetometer is tested and said errors are measured and resolved, which comprises correcting the misparabolism errors in said total field magnetometer by varying the shunt capacitance across the total field magnetometer, and subsequently correcting the reductance errors in said magnetometer by adjusting the paramagnetic mass in the proximity of the magnetometer elements so that the indication of field strength will be within prescribed limits of accuracy.

2. A method of correcting misparabolism and reductance errors in individual magnetometer elements of a total field magnetometer, which comprises correcting the errors due to misparabolism by varying the capacitance across the total field magnetometer terminals, and adjusting the paramagnetic mass in the proximity of predetermined magnetometer elements to correct reductance errors.

3. A method of correcting errors in the electrical characteristics of a total field magnetometer in a magnetic field when said errors have been resolved, which comprises correcting the inductance deviation from a known parabolic variation of inductance of a magnetometer element as the magnetic field varies from zero to full working strength by adjusting its shunt capacitance, and subsequently matching the inductance of all magnetometer elements at full field values of magnetic intensity by varying the paramagnetic mass in the vicinity of the individual magnetometer elements.

4. A method of correcting errors in a total field magnetometer when said errors are due to reductance variations between pairs of magnetometer elements in a total field magnetometer, which comprises altering the paramagnetic mass in the vicinity of predetermined pairs of magnetometer elements to lower the amount of flux passing through the core and thereby lowering its reductance.

5. A method of correcting reductance variations among magnetometer elements of a total field magnetometer, which comprises changing the paramagnetic mass in the vicinity of a magnetometer element but external thereto to lower the reductance of said magnetometer element.

6. A method of correcting errors in a total field magnetometer, when said errors are due to misparabolism of individual magnetometer elements of said total field magnetometer, which comprises adjusting the capacitance between the terminals of an individual magnetometer element of the total field magnetometer.

7. A method of adjusting a total field magnetometer wherein said magnetometer is placed in a constant unidirectional magnetic field of a predetermined value, the magnetometer is rotated successively around each of two magnetometer elements as axes, measuring variations from said constant predetermined value of magnetic field strength at major axes, and adjusting the paramagnetic mass shunting the core of appropriate magnetometer elements to correct reductance errors.

8. A method of adjusting a total field magnetometer, wherein a total field magnetometer is placed in a constant unidirectional magnetic field of a predetermined value, which comprises successively rotating the magnetometer around the axes of each of a plurality of magnetometer elements, measuring the magnitude of variation from said predetermined value at major axes and intermediate points, and adjusting the shunt capacitance across the terminals of said total field magnetometer to correct variations due to misparabolism errors in said magnetometer.

9. A method of adjusting a total field magnetometer having reductance errors which comprises varying part of the magnetic field passing through the core of said element by placing a paramagnetic mass external to said magnetometer element.

10. A method of correcting misparabolism and reductance errors in a total field magnetometer after the magnetometer elements of said total field magnetometer have been tested and the elements having misparabolism errors and/or having reductance errors have been determined, which comprises connecting a predetermined value of capacitance across the terminals of the appropriate elements of said total field magnetometer to correct misparabolism errors, and placing a paramagnetic mass of a predetermined value in proximity of the appropriate elements of said magnetometer to correct the reductance errors.

11. A method of correcting inductance errors in a total field magnetometer, wherein said magnetometer is placed in a constant unidirectional magnetic field of a predetermined magnitude, which comprises successively rotating the total field magnetometer around a plurality of axes, each of said axes being parallel to one of the magnetometer elements, measuring variations in the field strength indication at major axes and intermediate points, and adjusting the paramagnetic mass in the vicinity of appropriate magnetometer elements to correct said variations in field strength indication due to errors in inductance change of the magnetometer elements with a change in relative position between the field and said magnetometer elements.

12. A method of adjusting a total field magnetometer component of a magnetic field strength indicating instrument, which comprises placing said magnetometer in a constant unidirectional magnetic field of a predetermined value, successively rotating the magnetometer around the axes of each of a plurality of magnetometer elements, measuring the magnitude of variation from said predetermined value at major axes and intermediate points, and connecting a capacitor of predetermined value to the total field magnetometer to correct errors caused by misparabolism in the magnetometer.

13. A method of correcting errors in a total field magnetometer component of a magnetic field strength indicating instrument, which comprises placing said total field magnetometer in a constant unidirectional magnetic field of a predetermined value with one magnetometer element parallel to said field, rotating the magnetometer around said element as an axis, measuring the variations from said predetermined value of field strength indication at 90° intervals and intermediate points, rotating the magnetometer around a second element as an axis, measuring the variations from said predetermined value of field strength indication at 90° intervals and intermediate points, adjusting the shunt capacitances of appropriate elements to correct misparabolism errors, rotating the magnetometer in the unidirectional field with the first element as an axis measuring variations of magnetic field strength indications at 90° intervals and intermediate points, rotating the magnetometer around said second element as an axis, measuring the variation in magnetic field strength indications, and adjusting the paramagnetic mass in the vicinity of ascertained elements to correct reductance errors in magnetic field strength indication.

14. In a total field magnetometer, a non-magnetic metal casing substantially cubical in shape, a plurality of magnetometer elements arranged in pairs and permanently sealed therein, the axes of each pair being mutually perpendicular to each other and parallel to a face of the casing, a molding compound surrounding said magnetometer elements and completely filling the remainder of said casing to absorb shock and to support the elements firmly in their position, and paramagnetic masses affixed to the exterior of said casing in predetermined positions to correct errors in reductance of said magnetometer elements.

15. The apparatus as defined in claim 14 wherein the magnetometer elements are connected in series and their terminals brought to the exterior of said casing and have a capacitor of predetermined value connected across said terminals to correct misparabolism errors.

16. In a total field magnetometer, a non-magnetic metal casing substantially cubical in shape, a plurality of magnetometer elements arranged in pairs and permanently sealed therein, the axes of each pair being mutually perpendicular to each other and parallel to a face of the casing, a molding compound surrounding said magnetometer elements and completely filling the remainder of said casing to absorb shock and to support the elements firmly in their position, and paramagnetic masses comprising a non-metallic container having flaps extending therefrom and containing a predetermined amount of paramagnetic material completely surrounded by a durable molding compound affixed to the exterior of said casing by means of said flaps in predetermined positions to correct errors in reductance of said magnetometer elements.

17. In a total field magnetometer, a non-magnetic metal casing substantially cubical in shape, a plurality of magnetometer elements arranged in pairs and permanently sealed therein, the axes of each other pair being mutually perpendicular to each and parallel to a face of the casing, a molding compound surrounding said magnetometer elements and completely filling the remainder of said casing to absorb shock and to support the elements firmly in their position, and paramagnetic masses comprising a non-metallic casing containing a predetermined amount of paramagnetic material completely surrounded by a durable molding compound affixed to the exterior of said casing in predetermined position with relation to said magnetometer elements in order to shunt a portion of the flux around the core to lower the amount of flux linking said magnetometer element to correct errors therein.

References Cited in the file of this patent
UNITED STATES PATENTS

| | | |
|---|---|---|
| 780,374 | Negus et al. | Jan. 17, 1905 |
| 2,076,230 | Gillis | Apr. 6, 1937 |
| 2,388,664 | Bandur et al. | Nov. 13, 1945 |
| 2,485,931 | Slonczewski | Oct. 25, 1949 |
| 2,491,736 | Irwin | Dec. 20, 1949 |
| 2,504,778 | Young | Apr. 18, 1950 |
| 2,524,360 | Russell | Oct. 3, 1950 |
| 2,590,821 | Kiser | Mar. 25, 1952 |
| 2,606,960 | Little | Aug. 12, 1952 |
| 2,641,635 | Scal et al. | June 9, 1953 |